United States Patent [19]

King et al.

[11] 4,067,642

[45] Jan. 10, 1978

[54] REDUCTION OF MODAL AND CHROMATIC MATERIAL DISPERSION IN A MULTIMODE OPTICAL FIBER

[75] Inventors: Frederick David King, Smiths Falls; Felix Paul Kapron, Richmond, both of Canada

[73] Assignee: Northern Telecom Limited, Montreal, Canada

[21] Appl. No.: 711,419

[22] Filed: Aug. 3, 1976

[51] Int. Cl.$^2$ .............................................. G02B 5/14
[52] U.S. Cl. .................. 350/96 WG; 350/96 GN; 350/96 C
[58] Field of Search ......... 350/96 WG, 96 R, 96 GN, 350/96 C

[56] References Cited

U.S. PATENT DOCUMENTS

| | | | |
|---|---|---|---|
| 3,909,110 | 9/1975 | Marcuse | 350/96 WG |
| 4,006,962 | 2/1977 | Olshansky | 350/96 WG |

OTHER PUBLICATIONS

L. Jacomme "Modal dispersion in multimode graded-- index fibers," Applied Optics, vol. 14, No. 11, Nov. 1975, pp. 2578–2584.
W. C. Chiou "Spectral transmission characteristics and chromatic dispersion . . . " Appl. Optics vol. 14, No. 11, Nov. 1975, pp. 2585–2587.

*Primary Examiner*—John K. Corbin
*Assistant Examiner*—Rolf Hille
*Attorney, Agent, or Firm*—Sidney T. Jelly

[57] ABSTRACT

Modal dispersion and chromatic material dispersion in a multimode optical fiber is reduced by feeding the rays of the light beam into the end of the optical fiber the angle of each ray relative to the axis of the fiber varied in accordance with the wavelength of the ray. The shortest ray is fed at a zero angle and the longest wavelength at angle of $\phi$ max. $\phi$ max. is defined by the equation $$\sqrt{2 \left| \frac{dN}{N \, d\lambda} \right| \Delta\lambda}.$$

3 Claims, 7 Drawing Figures

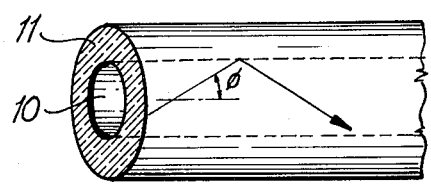
Fig-1-
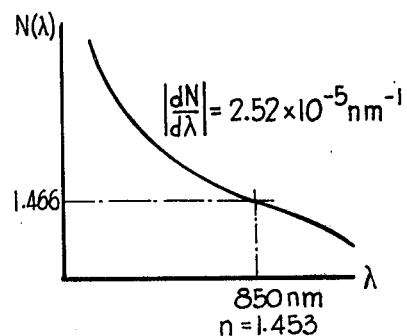
Fig-2-
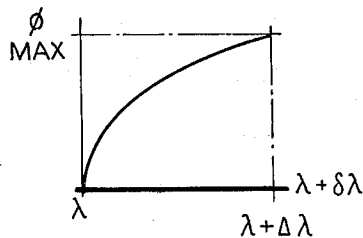
Fig-4a-
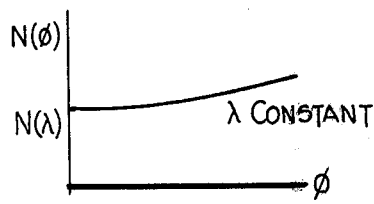
Fig-3-
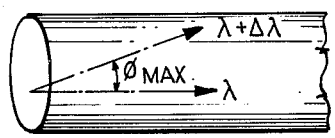
Fig-4b-
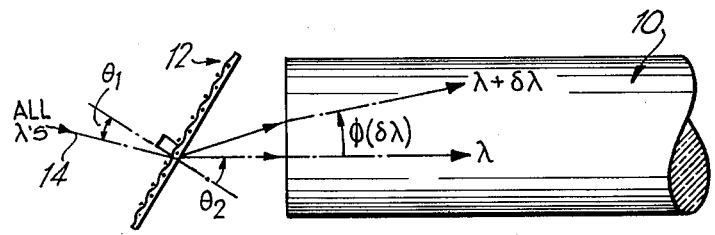
Fig-5-
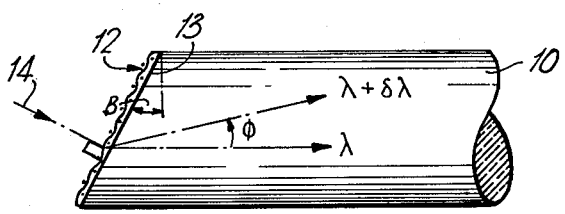
Fig-6-

REDUCTION OF MODAL AND CHROMATIC MATERIAL DISPERSION IN A MULTIMODE OPTICAL FIBER

This invention relates to the reduction of both modal and chromatic material dispersion in a multimode optical fibre.

Multimode guides are currently used in fibre-bundle optical communications and will also appear in the next generation of individual-fibre systems. Their 50 to 100μm diameter cores are compatible with multimode LED sources and simple connecting and tapping techniques. Unfortunately, their information carrying capacity is limited by the variation of signal group velocity both with mode number and with light wavelength; this presents a serious limitation with large numerical aperture fibres and broadband sources.

Prior art in this field has concentrated on gradient-index optical fibres to approximately equalize all ray paths and hence reduce mode dispersion. However, these require fabrication procedures more complex than for step-index guides, are capable of accepting only about half as much light from an LED and neccessitate twice the curvature radius in bends. Source collimation to excite only low order modes can reduce mode dispersion. Differential mode attenuation reducing the role of higher order modes and intermodal coupling tending to average the resultant modal velocity are both effective, but these processes are inherently lossy. All the above methods reduce modal but not chromatic material dispersion. A technique for reducing chromatic material dispersion is disclosed in copending application, Ser. No. 591,498 filed June 30, 1975 in the name of the present assignee, now U.S. Pat. No. 3,988,614.

The present invention provides for the suitable alteration of the angular light distribution entering the fibre so as to oppose the modal and chromatic effects, thereby achieving a substantial reduction in the net dispersive pulse broadening.

This invention will be readily understood by the following description of certain embodiments, by way of example, in conjunction with the accompanying drawings, in which:

FIG. 1 is a diagrammatic illustration of a multimode step-index guide or fibre;

FIG. 2 is a curve illustrating wavelength variation of the group index for fused silica;

FIG. 3 is a curve illustrating ray angle variation of the group index for a step-index fibre;

FIGS. 4a and 4b illustrate the angular variation of the input spectrum required for dispersionless guide or fibre operation;

FIG. 5 illustrates diagrammatically the use of a grating to provide angular variation of the input spectrum;

FIG. 6 illustrates diagrammatically the positioning of a grating on an inclined fibre face.

In the following disclosure and description certain reference characters are used and these are listed with their corresponding relationship, as follows:

$\lambda$ = wavelength
$\Delta\lambda$ = width of source spectrum
$\phi$ = mode angle or ray steepness (angle between ray and fibre axis)
$n$ = core index of refraction
$n - \Delta n$ = cladding index of refraction
$N$ = group index = light speed in vacuum (C)/signal speed in fibre
$NA$ = numerical aperture of fibre The group index N decreases with increasing wavelength ($\lambda$) and increases with the mode order or ray steepness, as expressed by the angle ($\phi$) between the ray and the fibre axis. It is therefore arranged for the long wavelengths to be fed into large angles within the fibre and short wavelengths into small angles; the precise functional relationship is derived below. These opposing modal and material effects result in a substantially constant group index for all rays, and this concept is the heart of the invention. With all group velocities approximately equalized, the information capacity of the fibre would be then very high.

As a simplified analytical explanation, consider the step-index fibre of FIG. 1 which has a core 10 of refractive index $n$ and a cladding 11 of index $n - \Delta n$ (with the reasonable approximation $\Delta n << n$). The group index is:

$$N(\lambda,\phi) = N(\lambda)(1 + \tfrac{1}{2}\phi^2) \quad (\phi^2 << 2) \tag{1}$$

where $$N(\lambda,0) = N(\lambda) \equiv n + \lambda|dn/d\lambda|$$

is the core (lowest mode) group index. As schematically indicated in FIGS. 2 and 3, N increases with mode angle $\phi$ but N (and $n$) decreases with wavelength $\lambda$. The maximum value of $\phi$ is related to the numerical aperture $$NA \equiv n\phi_{max} = \sqrt{2n\Delta n} \quad (\gtrsim 0.7 \text{ for } \tfrac{1}{2}\phi^2, \Delta n/n << 1) \tag{2}$$

Pulse spreading in a fibre of length L can then be specified by the time delay difference $T = (L/C)\Delta N$ due to two causes. For a monochromatic source $$\Delta N_1 \equiv N(\lambda,\phi_{max}) - N(\lambda,0) = N(\lambda) \cdot NA^2/2n^2 \tag{3}$$

is due to mode dispersion, whereas for a spectral width $\Delta\lambda$ $$\Delta N_2 \equiv N(\lambda) - N(\lambda + \Delta\lambda) = |dN/d\lambda|\Delta\lambda (\Delta\lambda \gtrsim 70nm) \tag{4}$$

is due to material dispersion. Numerically, for NA = 0.2 and $\Delta\lambda$ = 40 nm, the time delays corresponding to $\Delta N_1$ and $\Delta N_2$ are respectively $T_1$ = 67 ns/km and $T_2$ = 3.4 ns/km, using the values of FIG. 2. The concept of the present invention reduces the net effect of mode and material dispersions by putting them in opposition.

The two dispersions will cancel if $\lambda$ is launched into $\phi = 0$ with $\lambda + \Delta\lambda$ into $\phi_{max}$ such that $\Delta N_1 = \Delta N_2$, i.e.

$$NA = n\sqrt{\tfrac{2}{N}|\tfrac{dN}{d\lambda}|\Delta\lambda} \tag{5}$$

$$\simeq 8.52 \times 10^{-3}\sqrt{\Delta\lambda}$$

(The same result is obtainable from $(d/d\phi)N(\lambda,\phi) = 0$ at $\phi = 0$). Numerically, Na $\simeq$ 0.066 for $\Delta\lambda$ = 60 nm, a spectral full bandwidth which can be comfortably accommodated. For intermediate wavelengths, the angular distribution should satisfy $$\phi(\lambda + \delta\lambda) = \sqrt{\tfrac{2}{N}|\tfrac{dN}{d\lambda}|\delta\lambda} \quad (0 < \delta\lambda < \Delta\lambda). \tag{6}$$

-continued $$\phi \text{ degrees} = 0.336 \sqrt{\delta\lambda \ (nm)}$$

If this distribution, illustrated in FIGS. 4a and 4b, is maintained within the fibre, pulse spreading should be very small.

While the achievement of a close approximation to the above described desired distribution is somewhat difficult, any technique whereby longer emitted wavelengths are coupled to the higher order modes and the shorter emitted wavelengths coupled to the lower order modes will reduce the overall dispersion. Such techniques may utilize lenses, prisms, mirrors, gratings etc.

One approach is to utilize a device which will transform a collimated source beam incident upon it into a set of diverging beams with each propagating at a unique angle for each constituent wavelength. A diffraction grating can provide the required nagnitude of angular spreading.

In FIG. 5 a grating 12 is positioned opposite the end of the fibre core 10. If D is the grating spacing and $m$ is the diffraction order, one can derive the equation $$\phi(\delta\lambda) = \frac{\delta\lambda}{n} \left[ \left(\frac{D}{m}\right)^2 - \lambda^2 \right]^{-\frac{1}{2}} \quad m = \pm 1, \pm 2, \pm 3, \ldots \quad (7)$$

where for simplicity we have taken the rays 14 to be impinging normal to the plane of the grating 12. In the simpler variation of FIG. 6, the grating 12 may be laid upon an inclined fare 13 of the fibre core 10. Again with normal incidence, the inclination angle $\beta$ is chosen to satisfy $$\sin \beta = m\lambda/nD \quad (8)$$

and equation (7) holds.

It should be noted that Equation (7) varies linearly with $\sqrt{\delta\lambda}$ as required in Equation (6). The diffraction grating approach can therefore only approximately cancel modal and material dispersions. Nevertheless, if one optimizes the grating parameters with respect to the fibre and source parameters via the relation $$\left(\frac{nD}{m\lambda}\right)^2 = n^2 + \Delta\lambda \left[ (1.5 + \sqrt{2})\lambda^2 \left|\frac{dN}{Nd\lambda}\right| \right]^{-1} = CSC^2\beta, \quad (9)$$

then the chromatic dispersion of Equation (4) is compensated to the extent of $$\Delta N = \frac{1}{4}(3 - 2\sqrt{2}) \Delta N_2 \approx 0.043 \ \Delta N_2. \quad (10)$$

Numerically, again using the numbers of FIG. 2 and $\Delta\lambda = 40$ nm, Equation (9) gives $$\beta = 33.9°; D = 1.05m \ \mu m.$$

A high order $m$ may be used to increase the grating period D and the grating may be blazed to concentrate light into that order. Suitable gratings are commercially available or else may be fabricated (interferometrically, for example) by methods well known in the optical art. By Equation (10), even this imperfect compensation reduces the chromatic dispersion to 4.3% of the 3.4 ns/km following Equation (4), i.e., to a residual value of 0.15 ns/km.

Other dispersive devices may be used. For integrated optical circuitry, source light travelling in a thin film waveguide encounters a variable pitch in-plane grating above or within the guiding layer which performs the angular dispersion (U.S. Pat. No. 3,817,498). A distributed feedback laser may be designed to angularly spread out its range of emitting wavelengths to be coupled into the fibre.

What is claimed is:

1. A method of reducing modal and chromatic material dispersion in a multimode optical fiber, comprising feeding the rays of a light beam into an end of an optical fiber, the rays feed at an angle to the axis of the fiber which varies in accordance with the wavelength of a light ray, the shortest wavelength at a zero angle and the longest wavelength at an angle of $\phi_{max}$ where $$\phi_{max} = \sqrt{\frac{2}{N} \left|\frac{dN}{d\lambda}\right| \Delta\lambda,}$$

where N= group index of the fibre core, $\lambda$= wavelength of the ray and $\Delta\lambda$= width of source spectrum.

2. A method as claimed in claim 1, wherein each ray enters said end of said fiber at an angle $\phi$, where $$\phi(\lambda + \delta\lambda) = \sqrt{\frac{2}{N} \left|\frac{dN}{d\lambda}\right| \delta\lambda,}$$

and where $\delta\lambda$= an intermediate source wavelength above $\lambda$ where $0 \leq \delta\lambda \leq \Delta\lambda$.

3. A method as claimed in claims 1 and 2, including positioning a diffraction grating at said end of said optical fiber and impinging said light beam onto said grating, said grating difined by $$\left(\frac{nD}{m\lambda}\right)^2 = n^2 + \Delta\lambda \left[ (1.5 + \sqrt{2}) \lambda^2 \left|\frac{dN}{Nd\lambda}\right| \right]^{-1} = CSC^2\beta$$

where $n$= core index of refraction, $m = \pm 1, \pm 2, \pm 3 \ldots$ is the diffraction order, D is the grating spacing, $\beta$ is the angle between the plane of the grating and a plane normal to the axis of the fibre, and SCS is the trigonometric function.

* * * * *